March 28, 1933.                A. C. CASTLE                1,902,948
                              WELDING ELECTRODE
                             Filed Aug. 14, 1931
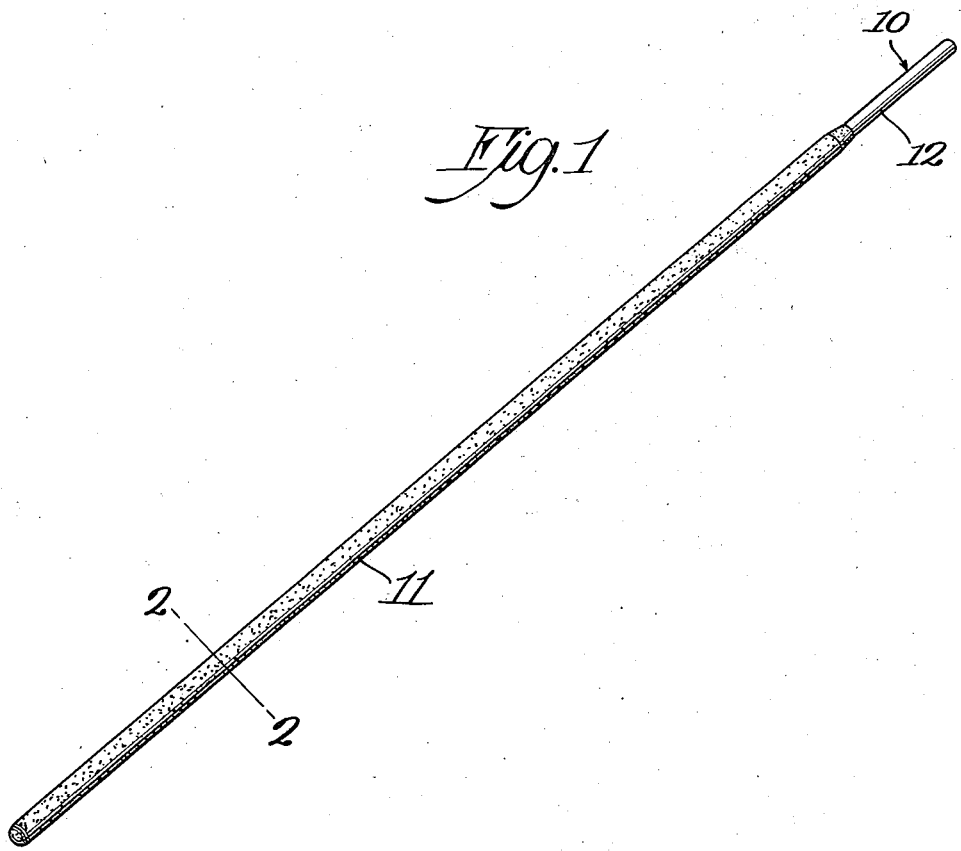
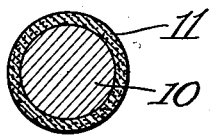
Inventor
Alfred C. Castle Patented Mar. 28, 1933

1,902,948

UNITED STATES PATENT OFFICE

ALFRED C. CASTLE, OF LAKE FOREST, ILLINOIS, ASSIGNOR TO A. M. CASTLE & CO., A CORPORATION OF ILLINOIS

WELDING ELECTRODE

Application filed August 14, 1931. Serial No. 557,010.

This invention relates to welding electrodes and more particularly to the coating for the electrode.

The principal object of the invention is the provision of a new and improved coating composition for use in coating electrodes whereby a maximum speed may be obtained in the welding operation.

Another object of the invention is the provision of a composition for welding electrodes that is non-fibrous and that may be easily applied to the rod.

A further object of the invention is the provision of a new and improved coating material that may be applied to the rod in one or more coats, as required, to obtain the desired thickness without the necessity of varying the ingredients of the individual coats.

Another object of the invention is the provision of a new and improved composition for coating electrodes that may be applied by dipping or by extrusion, and the desired thickness for different sized rods obtained by either process.

A still further object of the invention is the provision of a new and improved coating material for electrodes that is inexpensive to apply, efficient in use, and that is conducive to maximum speed in the welding operation.

Other and further objects and advantages of the invention will appear from the following description taken in connection with the accompanying drawing, in which Fig. 1 is a perspective view of an electrode having the improved coating material thereon; and Fig. 2 is a section on line 2—2 of Fig. 1.

It is common practice in the manufacture of welding electrodes to apply two coats to the electrode. The inner coating is usually of material more easily fused than the outer coat, whereby a crater will be formed in the end of the electrode. Such method of coating the rod is objectionable because of the necessity for keeping in stock two different materials for coating the rod, and is further objectionable because of the necessity of applying the coats to the electrode in a definite order. The present invention seeks to overcome these objections by the provision of a coating material that may be used without changing the ingredients employed, whether used for one or any number of coats, and that comprises gas and slag forming materials which form a crater about the end of the electrode during the use of the latter.

Referring now to the drawing, the reference character 10 designates a conventional welding rod which may be of any suitable composition, that shown, for instance, may be the type used in welding stainless steel or steel having a chromium content.

A coating 11 of the improved material is applied in any suitable manner. One end of the rod is left bare as at 12, which is adapted to be engaged by the electrode holder of the welding machine, the bare portion insuring a proper electrical contact between the holder and the electrode.

In the embodiment of the invention selected to illustrate one form of the invention, the rod is coated with a single coat of gas and slag forming materials, although it is understood that additional coats may be added to increase the thickness of the material on the rod.

The materials employed are mixed with a suitable binder. Water glass may be used as the binder, but the composition known in the trade as ferrotite is preferred because of its superior results.

After the material is prepared the rods 10 are dipped into the composition and the material adhering to the rod will form a coat about the rod which, on becoming dry, will become hard and will adhere to the rod. If desired, the composition may be extruded on the rod. When dipping the rod is resorted to, the rod may be dipped a second time in the same composition.

The following materials and the proportions given produce satisfactory results:

| | | |
|---|---|---|
| Silica | 27 pounds, 4½ oz. | |
| Calcium carbonate | 3 pounds, 4½ oz. | |
| Mang. dioxide | 6 pounds, 9 oz. | |
| Iron oxide (black) | 6 pounds, 0¼ oz. | |
| Alumina | 1 pound, 1½ oz. | |
| Ferromanganese | 1 pound, 1½ oz. | |
| Charcoal | 2 pounds, 7⅜ oz. | |
| Soda ash | 0 pound, 13⅛ oz. | |
| Magnesium metal | 0 pound, 2¼ oz. | |
| Aluminum powder | 0 pound, 2¼ oz. | |
| Carbon (lamp black) | 0 pound, 12 oz. | |
| Ferrotite | 11 quarts, 11½ oz. liquid measure. | |
| Water | 1 quart, 27 oz. liquid measure. | |

The above will give a composition having a specific gravity of about 1.91 which will give a coating of the proper thickness for ¼" and 3/16" rods.

It will be necessary to vary the water content of the above composition in order to obtain a coating of the desired diameter on rods of other sizes. After the rods have been coated they are dried and are then ready for use.

On rods of greater diameter it is usually necessary when the coating is applied by the dipping method, to dip the rod more than once. The rod is dried after each dipping so that the coating may be built up to any thickness desired.

It is thought from the foregoing taken in connection with the accompanying drawing, that the construction and operation of my device will be apparent to those skilled in the art, and that various changes in size, shape, proportion and details of construction may be made without departing from the spirit and scope of the appended claims.

I claim as my invention:

1. An electrode for arc welding comprising a metallic rod composed principally of ferrous material, a coating of slag and gas forming material attached directly to the surface of said electrode, said last-named material comprising silica approximately 30% of the mass, aluminum powder, less than 1% of the mass, a small amount of manganese dioxide and iron oxide (black), and a binder.

2. A welding electrode comprising a metallic rod composed principally of ferrous material, a coating attached directly to the surface of said rod, said coating comprising carbon not over 1% of the mass, silica approximately 30% of the mass, magnesium and sodium carbonate each less than 1% of the mass, all in a finely divided state, and ferrotite as a binder.

3. A welding electrode comprising a metal rod, coated with a mixture comprising silica not to exceed 30% of the mass, carbon, not to exceed 5% of the mass, a small amount of manganese dioxide and soda ash and a binder.

4. A composition for coating an arc welding electrode comprising silica approximately 30% of the mass, calcium carbonate not over 4% of the mass, manganese dioxide not over 8% of the mass and a small amount of iron oxide (black), alumina, ferromanganese, charcoal, soda ash, magnesium metal, aluminum powder and carbon (lamp black), and ferrotite and water.

5. A welding electrode comprising a metallic rod composed principally of ferrous material, coated with a mixture of the following materials, in substantially the proportions indicated:

| | |
|---|---|
| Silica | 27 pounds, 4½ oz. |
| Calcium carbonate | 3 pounds, 4½ oz. |
| Mang. dioxide | 6 pounds, 9 oz. |
| Iron oxide (black) | 6 pounds, 0¼ oz. |
| Alumina | 1 pound, 1½ oz. |
| Ferromanganese | 1 pound, 1½ oz. |
| Charcoal | 2 pounds, 7⅜ oz. |
| Soda ash | 0 pound, 13⅛ oz. |
| Magnesium metal | 0 pound, 2¼ oz. |
| Aluminum powder | 0 pound, 2¼ oz. |
| Carbon (lamp black) | 0 pound, 12 oz. |
| Ferrotite | 11 quarts, 11½ oz. liquid measure |
| Water | 1 quart, 27 oz. liquid measure |

In testimony whereof I affix my signature.

ALFRED C. CASTLE.